United States Patent [19]

Coonce et al.

[11] 4,064,370
[45] Dec. 20, 1977

[54] TIME-DIVISION SWITCHING SYSTEM

[75] Inventors: Homer Eugene Coonce; Judson Bruce Synnott, III, both of Naperville, Ill.; Austin Thomas Harty, deceased, late of Winfield, Ill., by Veronica M. Harty, administrator

[73] Assignee: Bell Telephone Laboratories, Incorporated, Murray Hill, N.J.

[21] Appl. No.: 701,604

[22] Filed: July 1, 1976

[51] Int. Cl.² ............................................. H04J 3/00
[52] U.S. Cl. ........................... 179/15 BA; 179/15 AT
[58] Field of Search ........ 179/15 BA, 15 BV, 15 AT, 179/15 AQ, 15 A

[56] References Cited

U.S. PATENT DOCUMENTS

| 3,736,381 | 5/1973 | Johnson | 179/15 AQ |
| 3,908,084 | 9/1975 | Wiley | 179/15 AQ |

Primary Examiner—Kathleen H. Claffy
Assistant Examiner—Joseph A. Popek
Attorney, Agent, or Firm—Kenneth H. Samples

[57] ABSTRACT

A high-capacity low-blocking time-division switching system including a space-division switching network is disclosed for switching serial digital data words synchronously received on time multiplexed lines in a first code format wherein each data word occupies substantially an entire time multiplexed channel time period. In order to achieve high capacity and low blocking, the space-division switching network is physically large resulting in delays of the digital data words transmitted therethrough, which delays are significant when compared with the time duration of a time-division multiplex channel and which vary in accordance with the path selected. The communication paths through the stages of the space-division network are reconfigured each time-division multiplex channel time duration, but due to the transmission delays, the effective transmission period is less than the time duration of a channel. Accordingly, data words are converted to a second code format, in which a start code is associated with each data word, and transmitted to the space-division network in a period of time less than the duration of a time multiplexed channel. The start code is utilized to permit asynchronous reception at the network outputs which is necessitated by the variability of time delays through the network. Additionally, the outputs of the space-division network are reconverted to the first code format for synchronous transmission on an output time-division multiplexed line.

9 Claims, 18 Drawing Figures

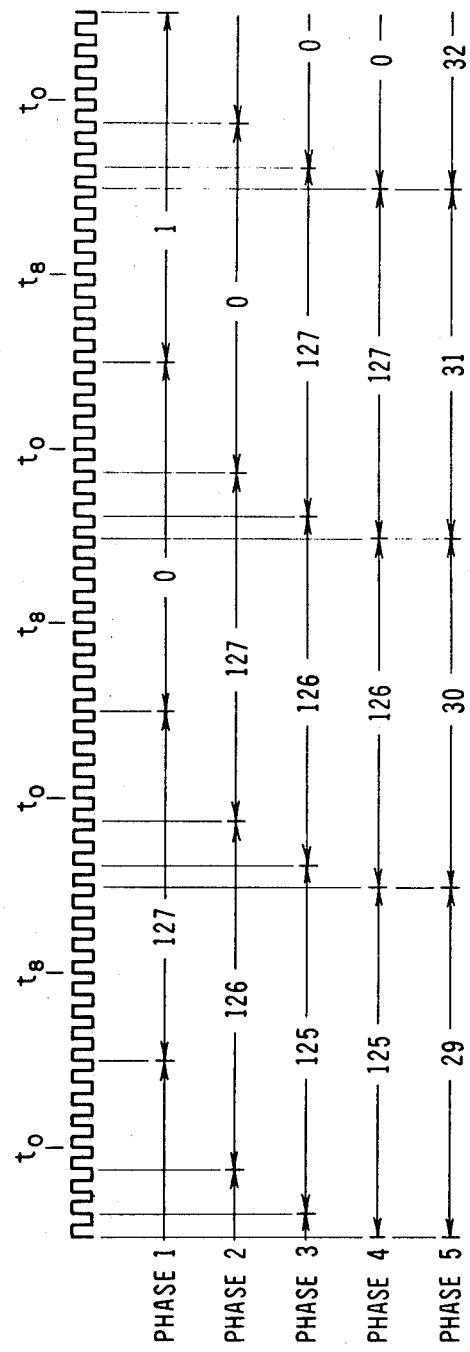

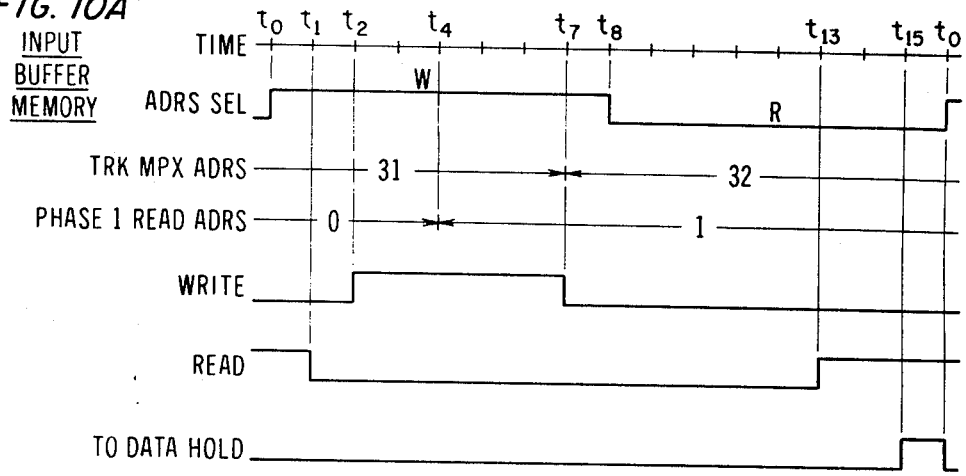
FIG. 10A INPUT BUFFER MEMORY
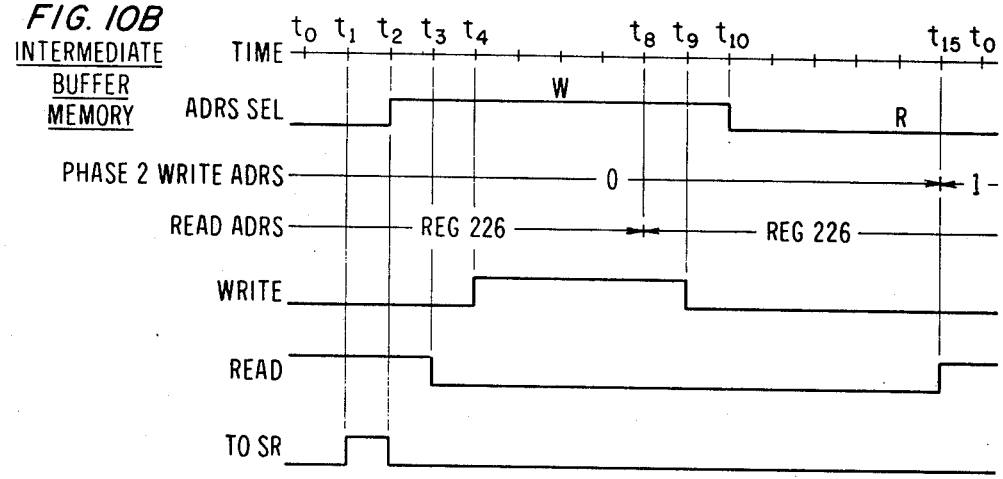
FIG. 10B INTERMEDIATE BUFFER MEMORY
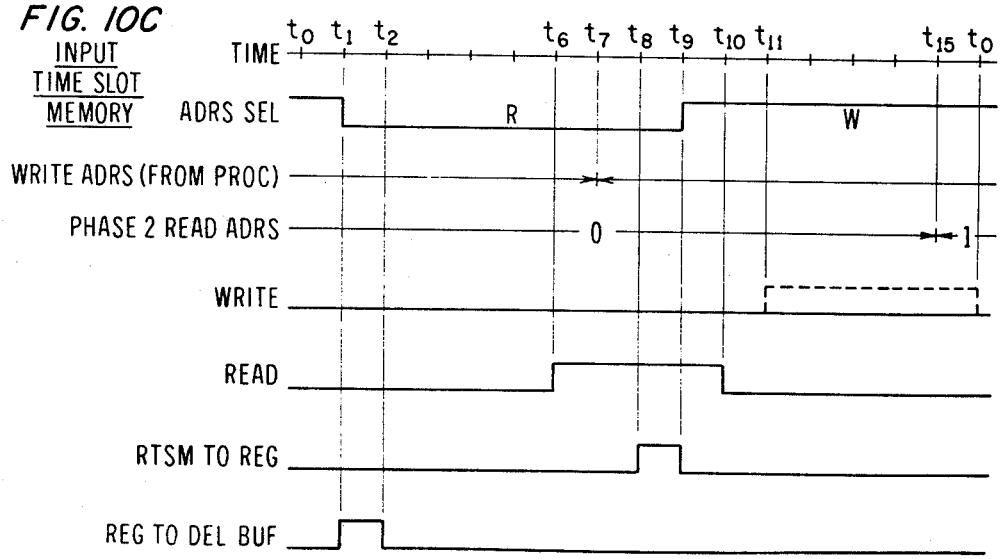
FIG. 10C INPUT TIME SLOT MEMORY

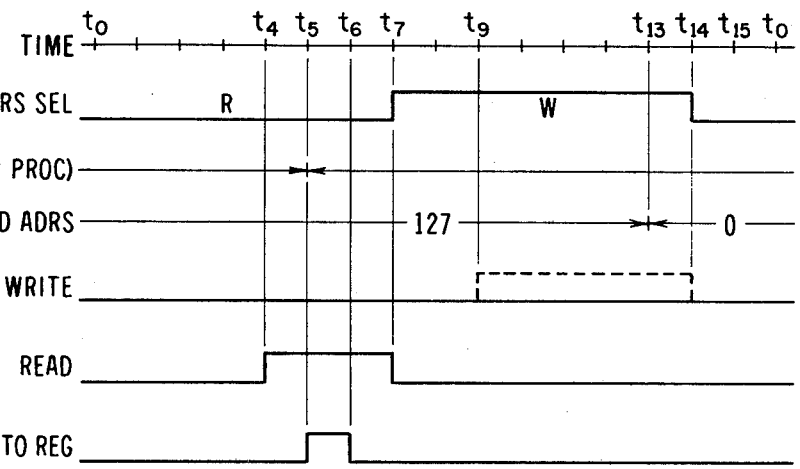
FIG. 10D CENTER STAGE TIME SLOT MEMORY
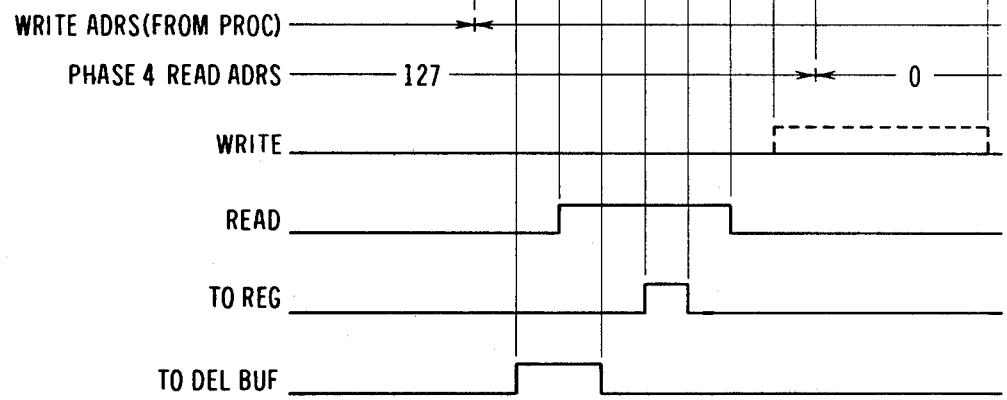
FIG. 10E OUTPUT TIME SLOT MEMORY
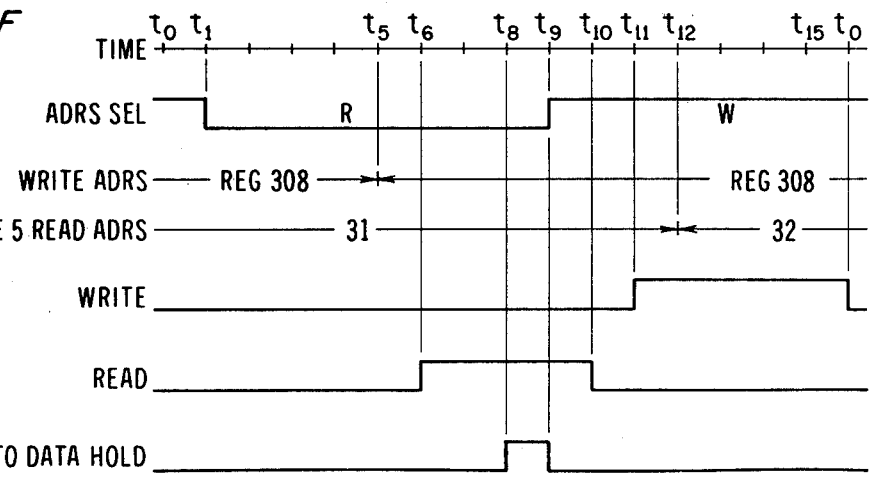
FIG. 10F OUTPUT BUFFER MEMORY

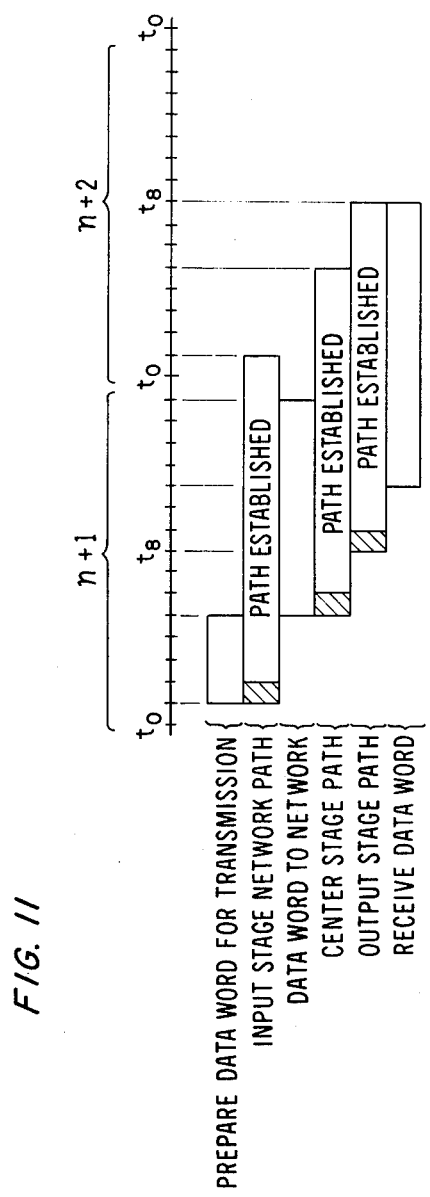

TIME-DIVISION SWITCHING SYSTEM

BACKGROUND OF THE INVENTION

The invention relates generally to time-division switching systems and more particularly to a telephone system for switching PCM (Pulse Code Modulated) data words among large numbers of time-division multiplex lines.

It is the function of a telephone switching system to establish communication connections between calling lines or trunks and called lines or trunks. Systems are known in the prior art in which analog signals on a plurality of lines or trunks are converted to PCM data words and are multiplexed onto a single transmission line having recurring time frames each comprising a plurality of channels. A channel is an identifiable time period on the time separated transmission line which occurs once in each time frame on the line. Known prior art systems typically have 24 channels per time frame and data words from 24 independent lines or trunks are transmitted during each time frame. In order to make maximum use of the available channels or conversely to minimize the time period of each channel, each data word occupies an entire channel. PCM data words may be switched among multiplex lines by selectively transferring PCM data words from the various channels on an input multiplex line to a predefined channel on one of a plurality of output multiplex lines. The transfer of data words from input multiplex lines to output multiplex lines may be accomplished by means of a space-division network which is reconfigured at a predetermined rate compatible with the rate at which the data is received from input multiplex lines. Typically such a switching network can be reconfigured and used to transmit data words once during each time period equal to the time period of a channel.

A space-division switching network which is utilized to transfer information among a large number of input and output multiplex lines must have a high capacity and low blocking. Such a switching network is typically physically large resulting in time delays of information transmitted therethrough and these delays vary in accordance with the particular path used for transmission through the network. The variability of transmission delays necessitates the concatenation of a start code to each data word before transmission to the network to permit asynchronous detection at the network outputs. This increases the amount of information each data word must convey. The previously mentioned reconfiguration rate requires that communication paths through each of the switches which make up network paths can exist for approximately the time period of a channel. Due to the variability of delay time, the effective time period for each point along the communication path is the channel time period minus a maximum delay in transmission. However, as previously stated, each data word when received by the switching arrangement occupies an entire channel time period.

SUMMARY OF THE INVENTION

In accordance with the present invention data words are received in a first code format on an incoming time-division multiplex line in which each data word occupies substantially an entire time multiplex channel. Each incoming data word is converted from the first code format to a second format, in which a start code is associated therewith, and the data word in the second format is transmitted to a switching network in a period of time less than the time duration of one of the incoming time multiplex channels. When operating in the above manner the network is reconfigured once per incoming time multiplex channel and the data words traverse the network regardless of the reduced effective time period for network path completion due to the reduced transmission time of the data words in the second format. In accordance with another aspect of the invention the data words are converted back to the first format after traversing the network and transmitted in the time multiplex channels of outgoing time multiplex lines.

More specifically, in an illustrative embodiment of the invention eight digit data words in the first code format comprise 16 digit portions with two digit portions representing each data word digit. With certain variations described later herein, the two digit portions of a data word digit generally represent the true and complement of the actual data word digit. The 16 digit portions representing each data word, as transmitted on a time multiplexed line, occupy substantially an entire incoming channel. An arrangement for transmitting and receiving digital information in the first code format is described in the copending application Nicodemus-Shoap, Ser. No. 693,372, filed June 7, 1976. The data words are received in the first code format by a receiver functioning in synchronism with an associated transmitter and are converted to the second code format in which each data word comprises eight binary digits, a parity digit and a leading "1" start code resulting in ten digit words in the second code format. These ten digit words are serially transmitted to the network in approximately 10/16ths of a channel time period. This leaves a guard band, in time, associated with each data word transmitted to the network, which band permits asynchronous reception of the entire data words at the network outputs regardless of the reduced effective time period for network path completion. Advantageously this arrangement can be combined with the sequential and overlapped network stage operation disclosed in copending application of J. W. Lurtz, Ser. No. 638,627, filed Dec. 8, 1975.

BRIEF DESCRIPTION OF THE DRAWING

FIGS. 2 through 6, when arranged in accordance with FIG. 7, illustrates the telephone switching system of FIG. 1 in more detail;

FIGS. 9, 10A through 10F and 11 through 13 are timing diagrams representing the timing relationship within the embodiment.

DESCRIPTION

Figures 12, 13:
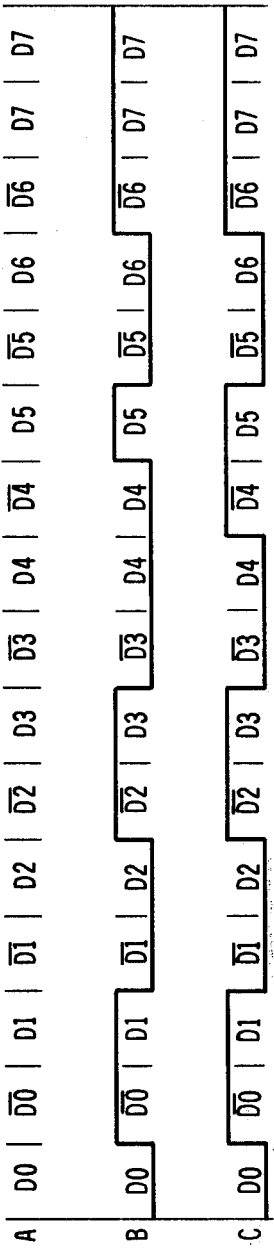

The illustrative toll telephone system selectively establishes communication paths between communication lines which extend from a toll office to other telephone offices. These communication lines may be voice frequency trunks carrying analog signals or time multiplexed lines carrying digital data. The illustrative system of FIG. 1 which is equipped to switch information among approximately 100,000 voice frequency trunks comprises a voice frequency unit 152 to which the voice frequency trunks are connected. Voice frequency unit 152 samples the analog signals on each incoming trunk once every 125 microseconds and digitally encodes each analog sample. The digital information resulting from the encoding operation is transmitted from voice frequency unit 152 to a buffer storage control 153 via one of a plurality time multiplexed lines 104 in 125 microsecond frames where each frame comprises 128 time separated channels (FIG. 12). The period of time allotted for each channel is referred to as a time slot and it has a time duration of approximately 976 nanoseconds. As used herein, the term "time slot" means an approximately 976 nanosecond period of time which may or may not coincide identically in time with other time slots or with the various time multiplexed channels. The digital information representing analog signal samples on each incoming voice frequency trunk is transmitted in a predetermined channel on predetermined ones of the time multiplexed lines 104 by the voice frequency unit 152.

Each channel comprises 16 basic time intervals of approximately 61 nanoseconds each, which in total fill the approximately 976 nanosecond time period of the channel. The code format used for transmission of data words in each channel, is $D_0\overline{D}_0, D_1\overline{D}_1, ---, D_6\overline{D}_6, D_7\overline{D}_7$ where each symbol $D_i$ represents a binary digit and each symbol $\overline{D}_i$ represents the inverse of an associated $D_i$ as shown in FIG. 13, line A. This format exists in all channels except the 128th channel (channel 127) in which $\overline{D}_4$ (FIG. 13, line A) is transmitted as $D_4$ rather than $\overline{D}_4$. FIG. 13, lines B and C are representations of the transmission of the code 01010101 in the 128th channel and in another channel, respectively. This code format is used since it is a fast, return to zero code, it provides channel synchronization by the transmission of bits $D_7D_7$ and it provides frame synchronization by the transmission of $D_4D_4$ in the 128th channel of each frame.

Buffer storage control 153, as described in greater detail below, converts the digital information received in each incoming channel on time multiplexed lines 104 into an eight-bit code and its associated parity bit and transmits the result of this conversion to a predetermined one of 1,024 intermediate buffer memory circuits 205. The eight-bit word and its associated parity bit is referred to herein as a data word. The intermediate buffer memory circuits 205 receive data words via an associated one of a plurality of time multiplexed lines 105. Each data word received by buffer storage control 153 on a given time multiplexed line 104 is written into the intermediate buffer memory circuit 205 associated with that time multiplexed line at a location corresponding to the assigned channel of the data word. A more detailed description of the transmission arrangement between the voice frequency unit 152 and the buffer storage control 153 is given in the copending U.S. Pat. application Nicodemus-Shoap, Ser. No. 693,372, filed June 7, 1976. By the operation of the buffer storage control 153 and the write controlling arrangement of the intermediate buffer memory circuits 205 the data words representing analog signals on a given incoming trunk are always stored in the same intermediate buffer memory circuit 205 at the same word location.

Each buffer memory comprises 128 word locations corresponding to the 128 channels of a time multiplexed frame. Memories of this size were chosen for the illustrative system for the sake of simplicity and it is to be understood that memories of a different size could be used, depending upon the rate of loading and unloading of the memories. Neither the memory elements nor the access circuitry for the memories are described in detail herein as the memory elements may be of any known type, such as semiconductor memories, and access circuitry for such memories is well known in the art. All of the buffer memories are capable of being both loaded and unloaded from specified locations during a single time slot. The loading and unloading are controlled in a manner described in detail later herein by addresses from a time-slot counter 131 and by timing signals from a timing distribution unit 132.

Each of the 1,024 intermediate buffer memory circuits 205 is associated with one input port of the system time shared space-division network 154. Data words are serially transmitted to the input ports of the space-division network 154 at the maximum rate of one data word per intermediate buffer memory per time slot under the partial control of information from a plurality of input time-slot memory circuits 220. The input time-slot memory circuits 220 contain information defining the address locations of the intermediate buffer memory circuits 205 from which data words are to be read and information defining a first portion of the paths to be established through the space-division network 154.

A second portion of each network path is defined by control words stored in center stage time-slot memory circuits 222 and the final portion of each network path is defined by control words stored in output time-slot memory circuits 221. The space-division network 154 has 1,024 output terminals each of which is uniquely associated with one of 1,024 output buffer memory circuits 215. Output buffer memory circuits 215 store the data words transmitted from intermediate buffer memory circuits 205 through the space-division switch 154. Each output time-slot memory circuit 221 contains information defining both the connections to be established in the final portion of network paths and the location in which data words are to be stored in the associated output buffer memory circuit 215.

Figure 1:
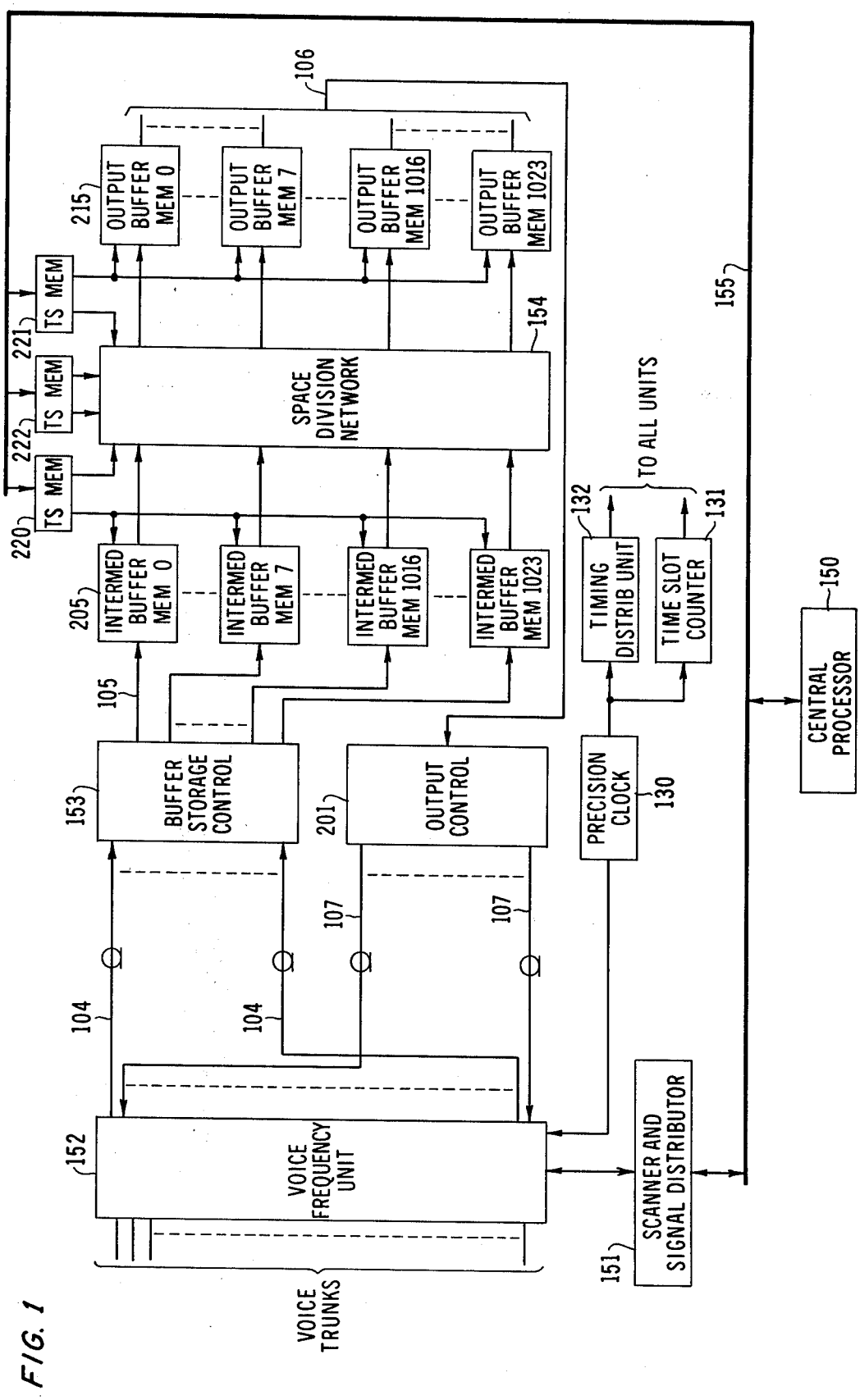
FIG. 1 is a block diagram of a telephone switching system embodying the invention.
Figure 2:
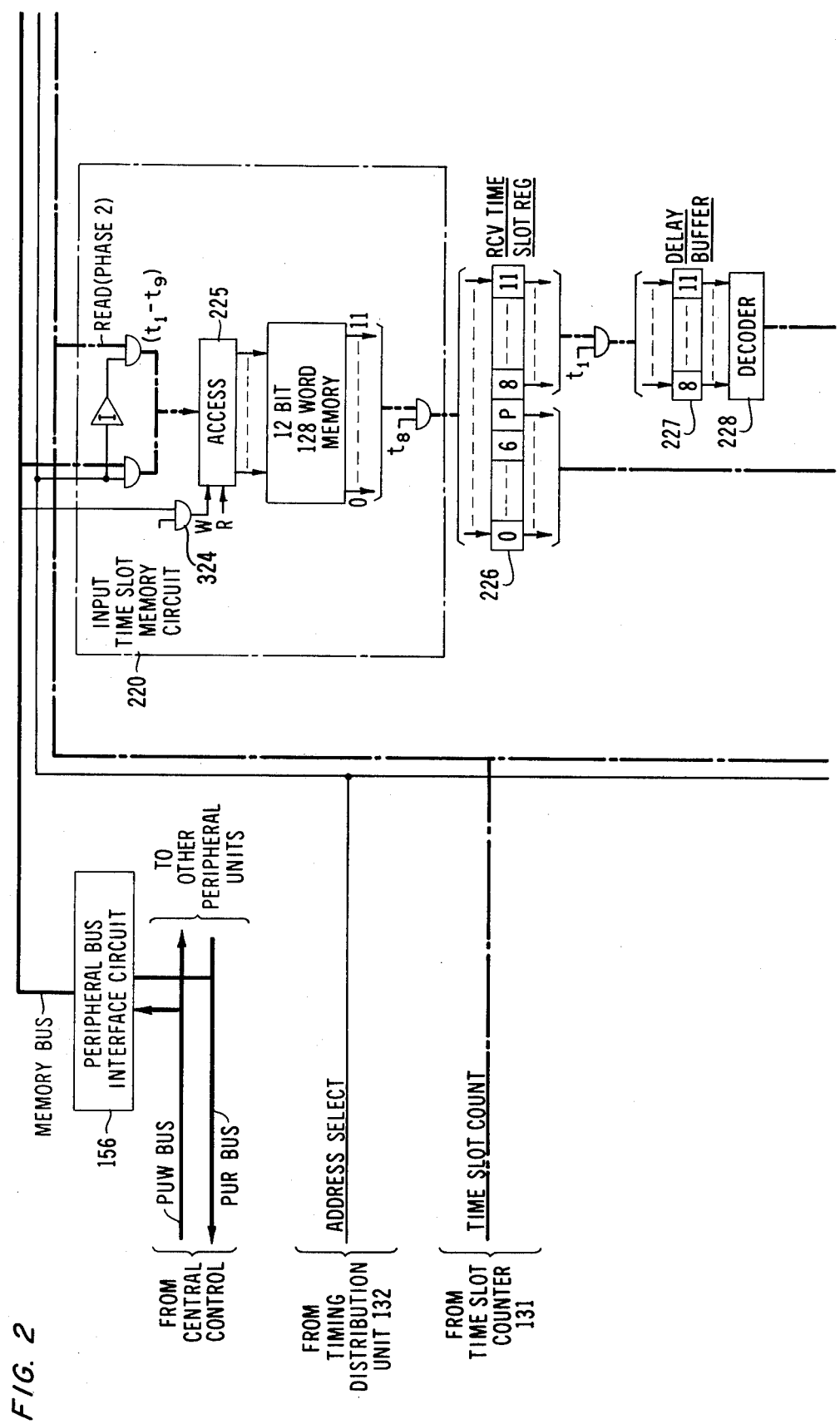
Figure 3:
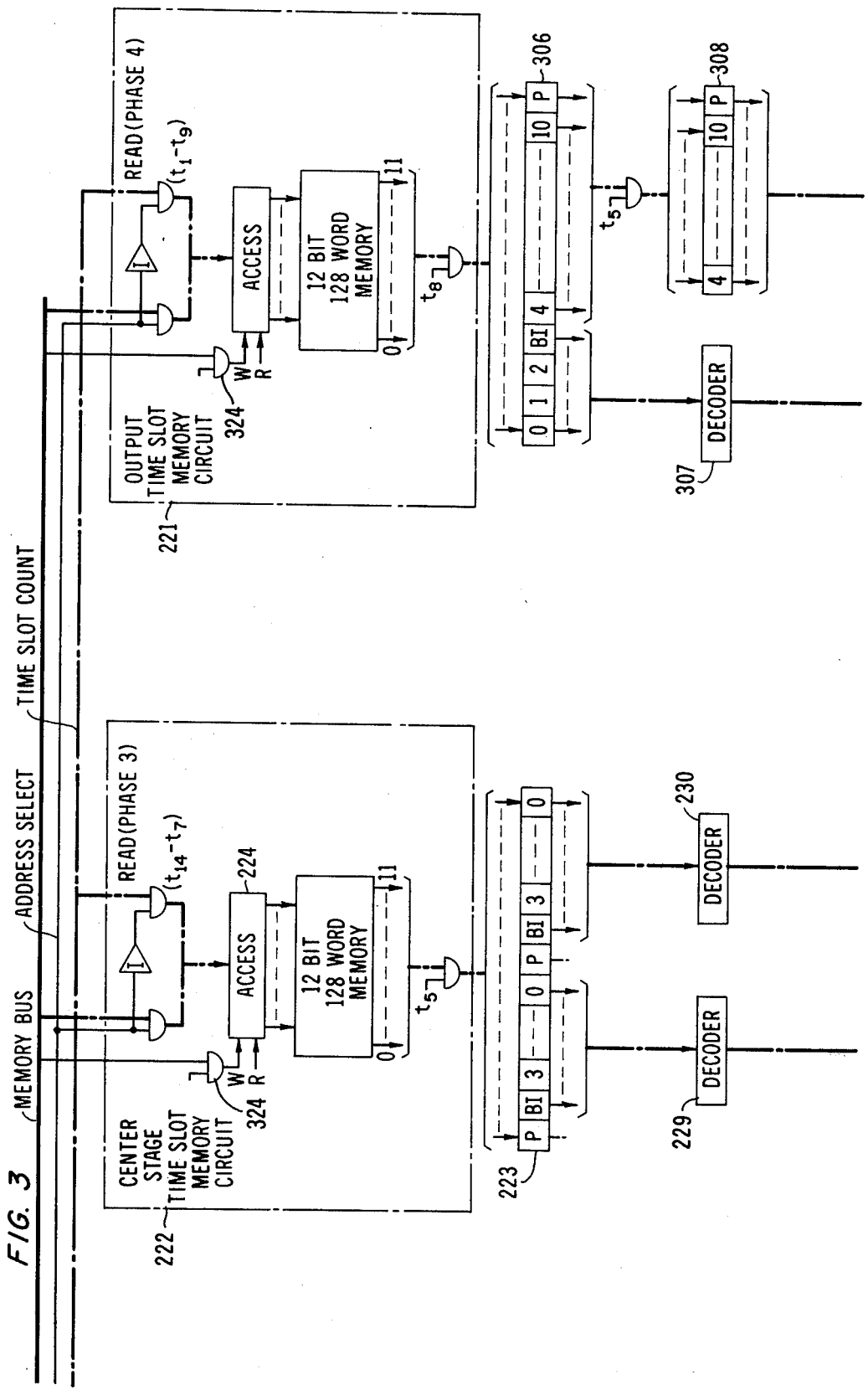

Once every time-slot data words are read from the output buffer memory circuits 215 and transmitted to an output control unit 201 via a plurality of time multiplexed lines shown in FIG. 1 as a single line 106. Each output buffer memory circuit 215 is uniquely associated with one of the time multiplexed lines 106 and data words are transmitted in predetermined channels of their associated time multiplexed line. The time multiplex format for lines 106 is the same as the format for time multiplex lines 105. Output control unit 201 converts each received data word to the format described for time multiplexed lines 104 (FIGS. 12 and 13) and transmits the resulting code in a predetermined channel of a predetermined one of a plurality of time multiplexed lines 107 to voice frequency unit 152. Voice frequency unit 152 converts each channel of digital information received on lines 107 to its analog equivalent which is applied to the outgoing trunk associated with the time multiplexed line and channel of that data word. By the operation of the output control unit 201 and the voice frequency unit 152 every outgoing trunk is associated with a unique address location in a specific output buffer memory circuit 215.

Figure 5:
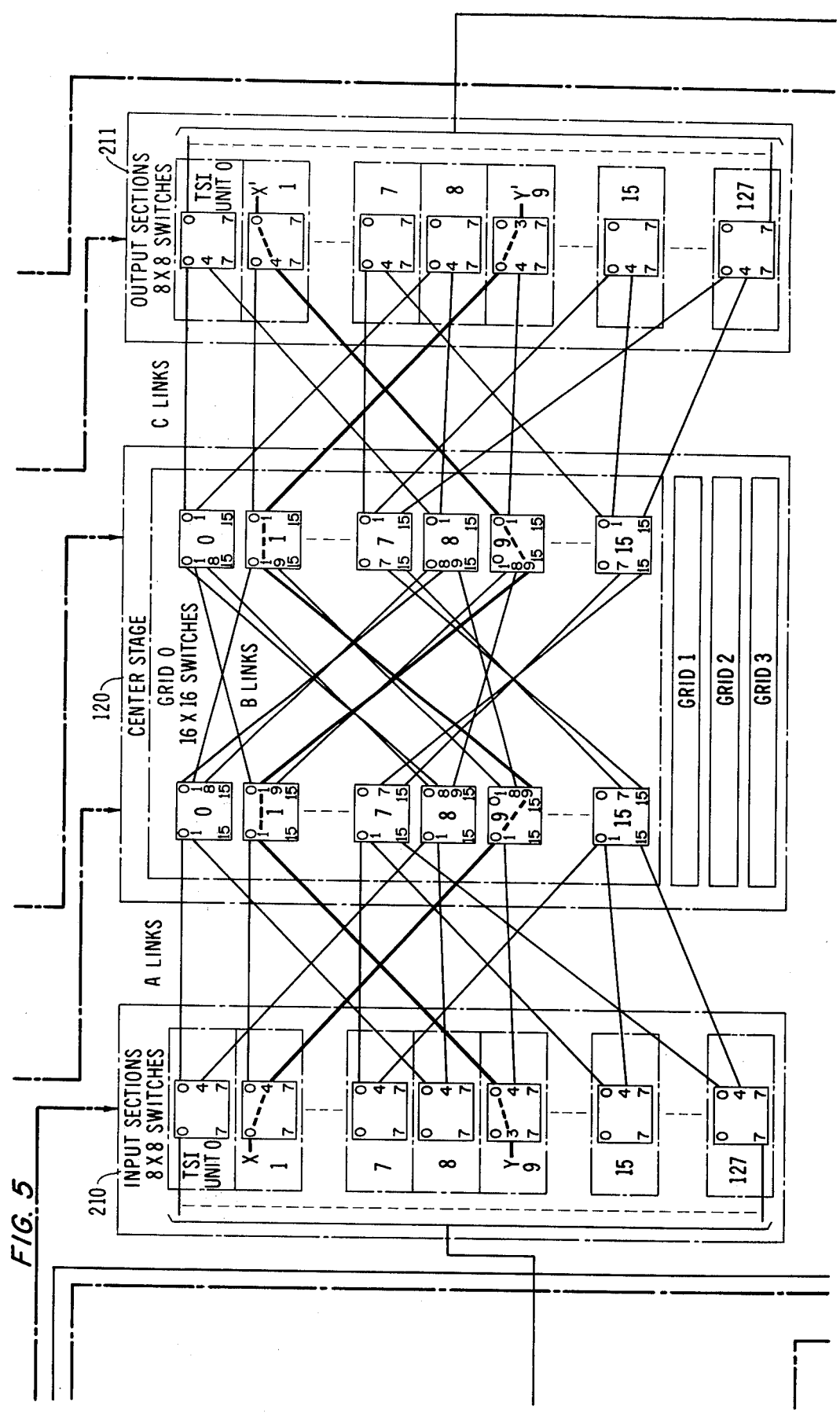

In a manner described in greater detail later herein, communication paths through each network portion are established in sequence and overlapped in time. In the present embodiment the space-division network 154 comprises three portions referred to as intput stage 210, center stage 120, and output stage 211 (FIG. 5). In order to efficiently transmit information, a set of communication paths through each network portion can exist for only one time slot before it is replaced with a new set of paths. Since a finite amount of time is required to establish such paths, the usable time of a given communication path, called a "transmission window," is slightly less than one time slot. The communication path portions are interconnected by links the lengths, and thus the transmission times, of which vary significantly with respect to the 976 nanosecond time slots. This variability of transmission time through the network necessitates nonsynchronous detection at the output ports of space-division network 154. In the present embodiment the nonsynchronous detectors used respond to a leading "1" which is applied to each data word before transmission to the network. This leading "1" adds a bit to the length of each transmitted data word making it ten bits in total. Additionally, the variability of transmission time delays reduces the usable portion of the "transmission windows" since the time at which a data word enters and leaves a given network portion is variable. The usable time for transmission is too small to permit the transmission of the ten-bit data words in the format in which they are received on time multiplexed lines 104 from voice frequency unit 152. In the present embodiment data words read from intermediate buffer memories 205 are first placed in shift registers included in those intermediate buffer memory circuits. The shift register contents are shifted serially to the space-division network 154, at a rate such that the entire ten bits are transmitted in approximately 610 nanoseconds. This transmission rate has a guard band of approximately 366 nanoseconds with respect to each transmitted data word, which band is sufficient to allow the entire 10-bit data word to traverse the network without loss of information due to the variability of transmission delay times.

As previously mentioned, the transfer of data words from the intermediate buffer memory circuit 205 through the time-shared network to the output buffer memory circuit 215 is controlled by information stored in the plurality of time-slot memories. Control words are read from the time-slot memories in response to addresses supplied by the time-slot counter 131, and a new set of transfer paths is established in the network for each data word accessed from intermediate buffer memory circuits 205. Control information is written into the time-slot memories by a central processor 150 via a peripheral bus 155. The central processor 150 may be any known data processing machine capable of communicating with the telephone equipment of this illustrative system and capable of making the various calculations and translations necessary for the control of the system. A processor having such general capability is described in *The Bell System Technical Journal,* Volume XLIII, September, 1964, Number 4, Part I, pages 1,845 to 1,923. In the illustrative system, the central processor 150 communicates with a peripheral unit referred to herein as the combined scanner and signal distributor 151. This unit autonomously scans all the trunks having an appearance on the voice frequency unit 152 for changes in supervisory states, and receives signaling information from the trunks. The combined scanner and signal distributor 151 communicates with the central processor 150 via the peripheral bus 155 and is responsive to commands from the central processor 150 to relay information to the processor and to transmit signaling information on the trunks.

The operation of the illustrative system may be better understood by means of a brief discussion of a sample call. The combined scanner and signal distributor 151 continuously scans the trunks for requests for service and, upon detection of such a request, passes this information, including information identifying the trunks requesting service, to the central processor 150. Upon command from the central processor, the combined scanner and signal distributor 151 begins to scan for incoming call signaling information, which is subsequently passed on to the central processor. The central processor interprets the call signaling information to identify the central office which is desired to be reached and selects an available outgoing trunk to that central office. By translation of the calling trunk identity information, the central processor determines the identity of the intermediate and output buffer memories and the addresses of the locations in these memories associated with the calling trunk. Similarly, by translation of the called trunk identity information, i.e., the selected trunk to the called office, the central processor determines the intermediate and output buffer memories and the address locations in these memories associated with the called trunk. The central processor subsequently selects two simultaneously available idle network paths. One path is used to transfer data words from the network input port associated with the calling trunk to the called trunk, and the other idle path is used to transfer data words from the input port associated with the called trunk to the output port associated with the calling trunk.

Furthermore, the central processor computes the necessary signaling information to be transmitted on the called trunk to the distant office and transmits this information to the combined scanner and signal distributor 151. After the necessary acknowledge signals have been received from the destination office, the central processor computes and transmits to the appropriate time-slot memories the information necessary to transfer the data words from the intermediate buffer memories through the network to the output buffer memories. Thereafter, information from the calling trunk is transferred to the called trunk and input information from the called trunk is transferred to the calling trunk once every 125 microseconds until the call is terminated.

Most of the functions performed in the illustrative system are performed in repetitive operating cycles of approximately 976 nanoseconds each. In order to provide timing control for the various functional units a precision clock 130 generates a series of timing pulses approximately 61 nanoseconds apart (FIG. 9, line 1). A time slot (976 nanoseconds) for any given functional unit is thus defined by 16 consecutive timing pulses from precision clock 130. A timing distribution unit 132 receives timing pulses from the precision clock 130 and in response thereto generates a recurring sequence of timed control signals. The sequence of timed control signals generated by the timing distribution unit 132 repeats itself every 16 timing pulses. All of the timed control signals generated by timing distribution unit 132 begin and end at predefined ones of the timing pulses from precision clock 130. Thus, each sequence of timed control signals generated by timing distribution unit 132 has 16 basic times called $t_i$'s at which control signals can be started or stopped. For convenience in the written description and drawing, the specific times $t_i$ are designated $t_0$ through $t_{15}$. In the following description the designations $t_i$ may also be assigned a prefix comprising a letter - number combination such as $(n+1)$. This designation allows the further definition of the relative time between signals when they do not occur during the same 976 nanosecond time slot. For example, if a first gating signal is generated at $nt_5$ and a second gating signal is generated at $(n+2)t_4$ there are 31 times $t_i$ between the gating signals. The breakdown of these is as follows:

| | |
|---|---|
| $nt_5$ through $nt_{15}$ | 10 bit times |
| $(n+1)t_0$ through $(n+1)t_{15}$ | 16 bit times |
| $(n+2)t_0$ through $(n+2)t_4$ | 5 bit times |
| total | 31 bit times |

Although each basic unit of the illustrative system, such as the buffer memories and time-slot memories, is operated in repetitive cycles of approximately 976 nanoseconds, the specific functions performed by each basic unit may be different at any given time $t_i$. For example, at time $t_9$ the intermediate buffer memory circuits 205 are near the end of a write operation while at the same time output time-slot memory circuits 221 are just completing a read operation. Additionally, each of these units may be functioning with respect to a different data word.

In the illustrative system data words undergo transmission delays of approximately one-half time slot or 8 times $t_i$, plus or minus the previously mentioned variable delays, from the output of an intermediate buffer memory circuit 205 to the output ports of the space-division network 154. Additionally, a data word requires 10 times $t_i$ for transmission from the intermediate buffer memory circuits 205. Due to the time required to transmit a data word and the delays occasioned while traversing the network approximately 18 times $t_i$ elapse between the beginning of transmission from an intermediate buffer memory circuit 205 and the end of transmission through the space-division network 154. Since a given network path can exist for only approximately 15 times $t_i$—one is lost due to the time required to establish the path—the total time required to transmit data words through the network is approximately three time intervals $t_i$ longer than could be transmitted if all network stages were simultaneously established.

A timing diagram showing the timing of the illustrative system employed to avoid this problem is shown in FIG. 11. In accordance with the illustrative system information is read from intermediate buffer memory circuits 205 at $(n+1)t_1$ and prepared for serial transmission through the network. The input time-slot memory circuits 220 define the address locations, computed by central processor 150, in intermediate buffer memory circuits 205 which are to supply the data words. Also, in response to information from the input time-slot memory circuits 220 a network path is established through the input stage switch 210 by time $(n+1)t_2$ (FIG. 11, line 2). At time $(n+1)t_5$ the serial transmission of data words from the intermediate buffer memory circuits 205 begins and by time $(n+1)t_6$ a path through the center stage switch unit 120 (FIG. 11, line 4) is established in accordance with information from center stage time-slot memory circuits 222. A path through the output stage switch 211 (FIG. 11, line 5) is established by $(n+1)t_9$ in accordance with information from output time-slot memory circuits 221. In accordance with the above description the input stage paths exist from $(n+1)t_2$ to $(n+2)t_1$, the center stage paths exist from $(n+1)t_6$ to $(n+2)t_5$, and the output stage paths exist from $(n+1)t_9$ to $(n+2)t_8$. Due to this overlapped operation of the three network stages paths exist through the network which have sufficient overall duration to allow the transmission of entire data words while each individual stage has paths completed therethrough which exist for slightly less than one time slot.

DETAILED DESCRIPTION

As previously stated, synchronism is maintained in the illustrative system by timing pulses from precision clock 130. A time-slot counter 131 responds to signals from precision clock 130 to generate addresses for certain of the control and data memories employed in this system. The addresses generated by time-slot counter 131 comprise five sequential address series each being offset in phase from the other address series. Each address series comprises a repetitive sequence of 128 addresses from 0 through 127 and within any given series the address is changed once per time slot. These address series which are referred to as address phase 1 through address phase 5 are shown in FIG. 9 for a period of time near the operations with respect to address 126.

Figure 8:
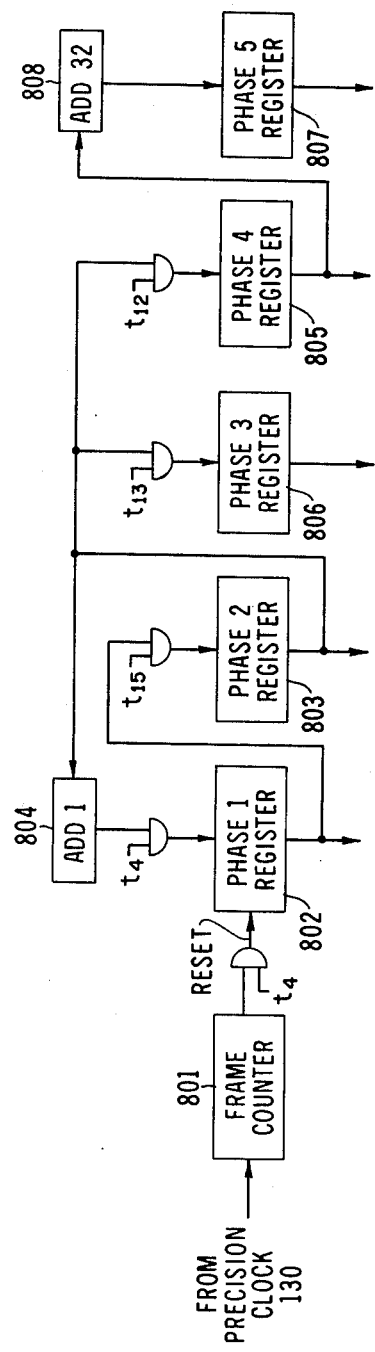
FIG. 8 is a block diagram of the time-slot counter employed by the disclosed system.

Time-slot counter 131 shown in FIG. 8 includes a frame counter circuit 801 which receives the timing pulses from the precision clock 130. Frame counter circuit 801 counts the pulses from the precision clock 130 and generates a reset command during one time slot of every 128 time slots. The reset command is gated to a phase 1 register 802 at time $t_4$ which, in response thereto, is reset to zero. The output signals of the phase 1 register comprise the phase 1 address sequence. At time $t_{15}$ the contents of the phase 1 register 802 are gated to a phase 2 register 803 which results in both registers storing the same address. The output signals of the phase 2 register 803 comprise the phase 2 address sequence and are applied to an add one circuit 804. At every time $t_4$ the outputs of the add one circuit are gated to the phase 1 register and replace its contents unless the phase 1 register 802 is then being reset. The result of the operations of the phase 1 and phase 2 registers, the add one circuit, and the gates operated at times $t_4$ and $t_{15}$ is two offset recurring series of sequential addresses from 0 through 127 as shown in lines 2 and 3 of FIG. 9.

The outputs of the phase 2 register 803 are gated to a phase 4 register 805 at each time $t_{12}$ and to a phase 3 register 806 at each time $t_{13}$. The outputs of the phase 3 register 806 and the phase 4 register 805 are the phase 3 and the phase 4 address series, respectively. The output signals of the phase 4 register 805 are also applied to a phase 5 register 807 via an add 32 circuit 808. In this manner the contents of the phase 5 register 807 are changed at the same time the phase 4 register 805 is changed but the contents of the phase 5 register 807 are an address 32 greater. The exact number 32 is not essential to the operation of the illustrative system and it is chosen merely to provide a separation between the location written in output buffer memory circuits 215 and the location read from those same memories. The use of the address phases 1 through 5 is described in greater detail herein.

Figure 4:
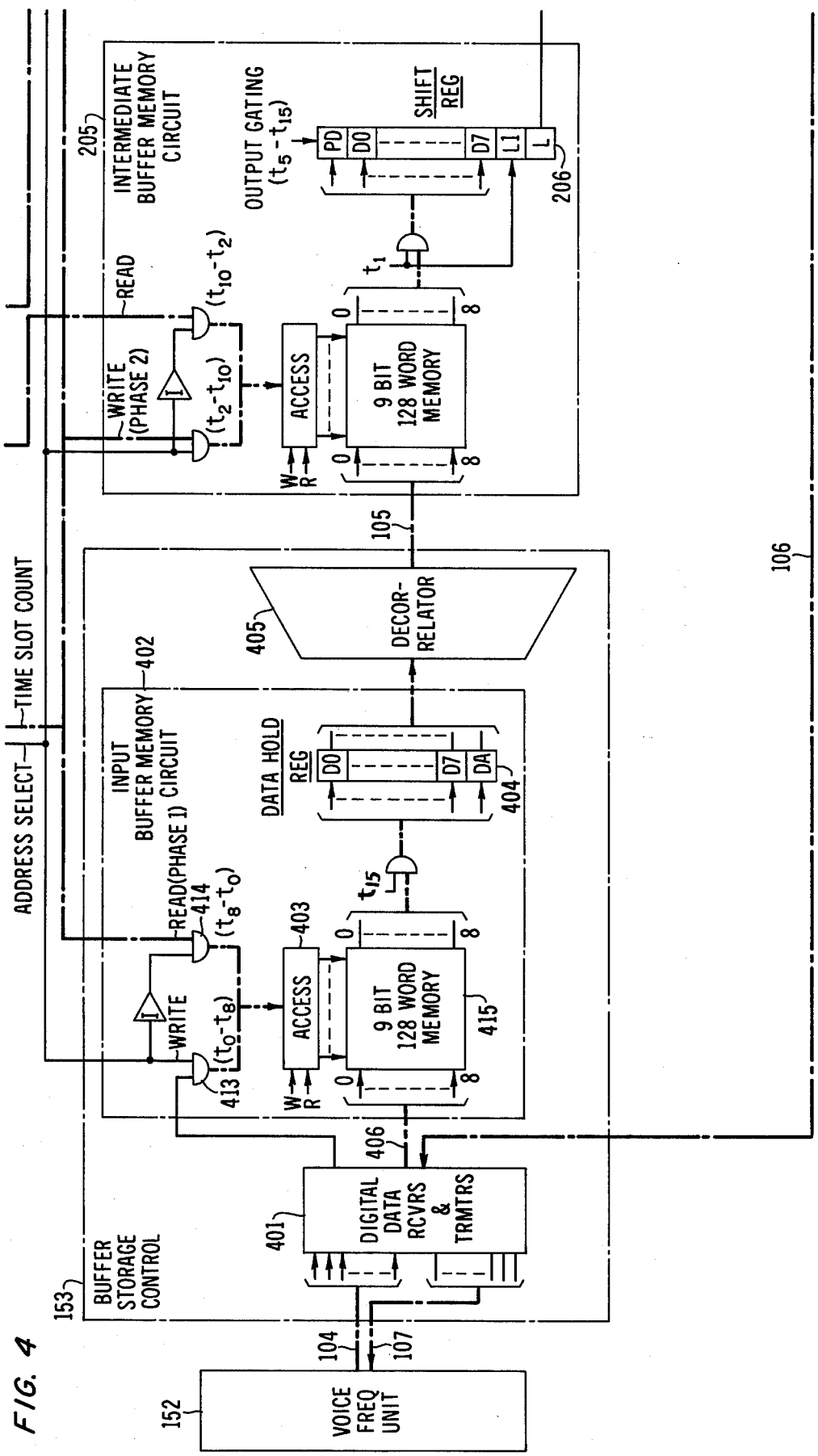
Figure 7:
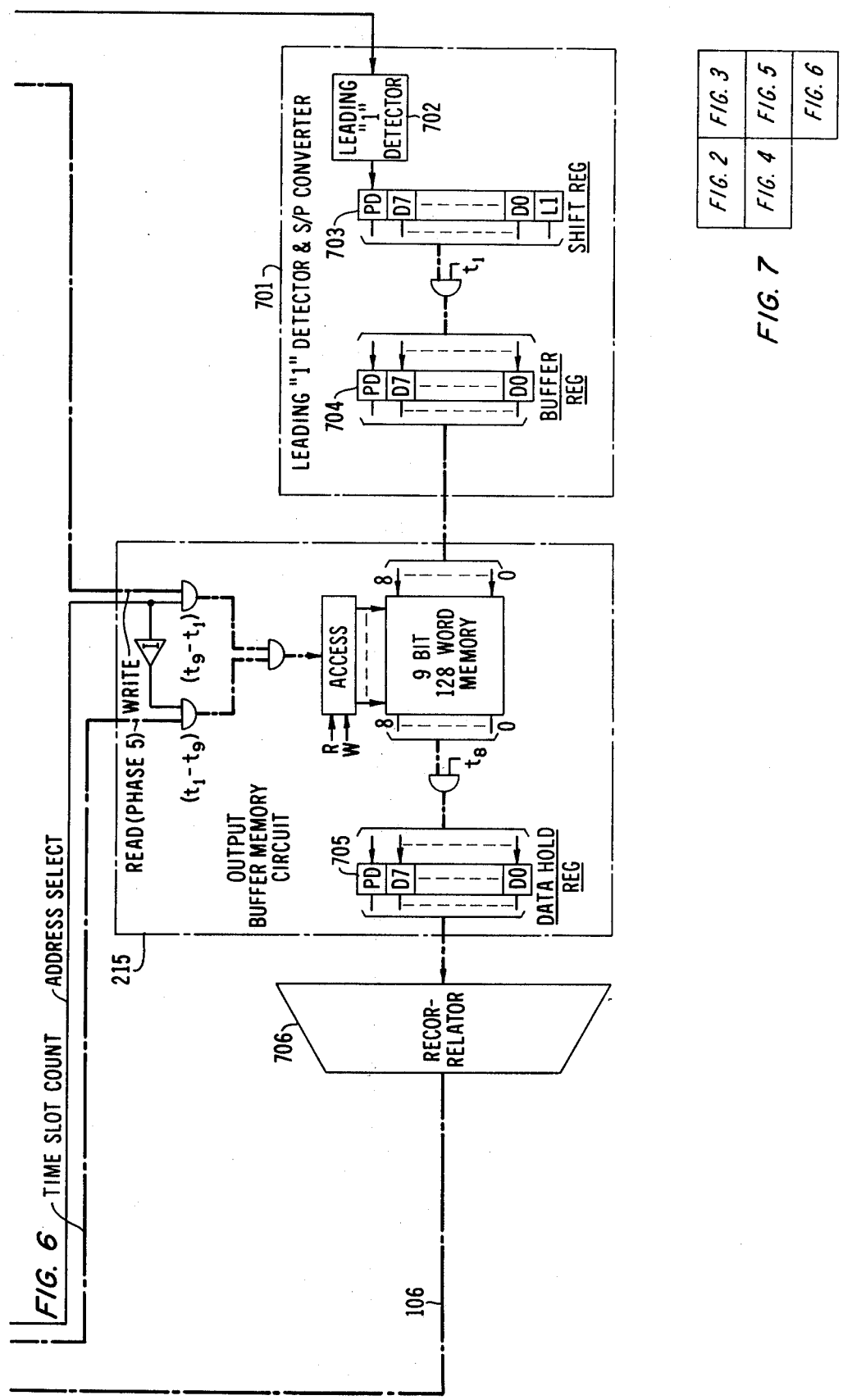

The following description is made with reference to FIGS. 2 through 6 arranged in accordance with FIG. 7. In FIG. 4 the buffer storage control 153 is shown in more detail than in FIG. 1. Buffer storage control 153 comprises a digital data receiver and transmitter unit 401 to which the input time multiplexed lines 104 and output time multiplexed lines 107 are connected. The digital data receiver and transmitter unit 401 converts the incoming data words from the 16 digit portion serial code format to an eight bit binary code and an associated parity digit. This is done in accordance with the previously mentioned Nicodemus-Shoap application. The resulting data words are gated to a plurality of input buffer memory circuits 402. Each input buffer memory circuit 402 is uniquely associated with a time multiplex bus 406 and each data word is gated from the digital data and receiver to the associated input buffer memory in a predetermined channel on a predetermined one of the plurality of time multiplex buses 406. The digital data receiver and transmitter unit 401 also generates and transmits with each data word the channel address of that data word which is used as a storage address by the input buffer memory circuit 402. By the above channel and time multiplex bus assignment the data words generated from the analog signals on any given trunk circuit are always stored in the same address location in the same input buffer memory circuit 402.

Each of the data and control memory units in this system includes an address selection circuit which responds to timed control signals from the timing distribution unit 132 to alternately gate read and write addresses to the memory access circuitry. This signal consists of a logical "1" for eight times $t_i$ which gates the write address to the memory and a logical "0" for the remainder of the operating cycle which gates the read address. FIGS. 10A through 10F show the various timed gating signals generated by timing distribution circuit 132 and address signals applied to the data and control memories employed in the illustrative embodiment. Accessing circuitry is also associated with each data and control memory circuit which receives specific read and write control signals from the timing distribution unit 132. These signals define the function to be performed in response to the address at its input. Additionally, each memory has at least one output register into which the output signals of the memory are gated at particular times.

The address selection signal (FIG. 10A, line 2) transmitted to input buffer memory circuits 402 is a logical "1" from $t_0$ to $t_8$ and logical "0" from $t_8$ to $t_0$. An AND gate 413 responds to this address select signal by gating the channel address generated by the digital data receiver and transmitter unit 401 to the memory access circuit 403 of input buffer memory circuit 402 from time $t_0$ to time $t_8$. From time $t_2$ to $t_7$ a logical "1" (FIG. 10A, line 5) is transmitted from timing distribution unit 132 to the write enable lead "W" of input buffer memory circuit 402. The memory access circuit 403 in response thereto controls input buffer memory 415 to store the data word then present on its associated time multiplex bus 406 at the address from the digital data receiver and transmitter unit 401.

During the time period from $t_8$ to $t_0$ a logical "0" (FIG. 10A, line 2) is applied to the address selection circuit of input buffer memory circuit 402. This signal is inverted and applied to an AND gate 414 which in response thereto gates a read address to the memory access circuit 403. This read address is the current address of the phase 1 address sequence (FIG. 10A, line 4) from time-slot counter 131. The timing distribution unit 132 transmits a logical "1" to the read enable lead, designated "R", of memory access circuit 403 from time $t_{13}$ to $t_1$. In response to this logical "1", memory access circuit 403 controls the reading of input buffer memory 415 at the address location defined by the phase 1 address sequence. At time $t_{15}$ the data word read from the input buffer memory 415 in response to the read address is gated to a data hold register 404. The contents of the data hold register 404 are applied to one of the intermediate buffer memory circuits 205 via a decorrelator circuit 405 and an associated one of time multiplexed lines 105.

It should be mentioned that 128 decorrelator circuits are present in the illustrative system and that each receives inputs from seven input buffer memory circuits 402 and applies its outputs to eight intermediate buffer memory circuits 205. It is the function of the decorrelator circuits 405 to equalize the traffic load and to effect a reduction of the traffic load applied to the input ports of the switching network. The decorrelator circuits 405 act as both expanders and as distribution circuits. During each time slot each decorrelator circuit 405 distributes, in accordance with a predetermined pattern, a data word from the same address location in each of its associated seven input buffer memory circuits 402 to seven of the eight intermediate buffer memory circuits 205 associated therewith. Thus, during each time slot 128 groups of seven input buffer memories are transmitting data words through associated ones of 128 decorrelator circuits 405 to 128 groups of eight intermediate buffer memory circuits 205. The data words are stored in the intermediate buffer memory circuits 205 at the same address location from which they were read, however, they are stored in an intermediate buffer memory predefined by decorrelator circuits 405. A more detailed description of the decorrelator circuit 405 is given in the Johnson et al. U.S. Pat. No. 3,735,381 issued Mar. 29, 1973.

Representations of the timing and addressing signals for the intermediate buffer memory circuits 205 are shown in FIG. 10B. The address selection circuitry for intermediate buffer memory circuits 205 is substantially the same as that described for input buffer memory circuits 402 except that, in response to address selection signals (FIG. 10B, line 2) from the timing distribution unit 132, the write address is available from $t_2$ to $t_{10}$ and the read address is available from $t_{10}$ to $t_2$. The write addresses (FIG. 10B, line 3) received by intermediate buffer memory circuits 205 comprise the phase 2 address sequence from time-slot counter 131. The write control signal (FIG. 10B, line 5) generated by timing distribution unit 132 is received by the access circuitry on lead "W" of the intermediate buffer memory circuits 205 from time $t_4$ to $t_9$. This results in the storage of the data words on time multiplexed line 105 at the addresses defined by the phase 2 address sequence. The read addresses for intermediate buffer memory circuits 205 are transmitted from an input time-slot memory circuit 220, one of which is uniquely associated with each intermediate buffer memory circuit 205. These read addresses are the address locations within the associated intermediate buffer memory circuits 205 which are to be accessed and thereby define the data word which is to be transmitted through the switching network. For this reason all of the intermediate buffer memory circuits 205 are not necessarily read in response to identical addresses. The control words stored in input time-slot memory circuits 220 which define the intermediate buffer memory circuit 205 read addresses and the interconnection of calling and called trunks originate from the central processor 150.

FIG. 5 shows the time-shared space-division network of the illustrative system. This network is completely symmetrical, however, it is to be understood that a symmetrical network is not required to practice the invention. In the network of FIG. 5 the pattern of links interconnecting the network stages to the left of an imaginary center line drawn between the second and third stage switches of the space-division network is a mirror image of the pattern to the right of the center line. As previously described, there is an identifiable input port and output port associated with each voice trunk connected to the system. The network is time-shared and, therefore, a plurality of channels is associated with each port of the network, but each input voice frequency trunk can be associated with only one specific input port and each output trunk can be associated with only one specific output port. The network terminal designations are chosen such that the output port associated with a certain voice trunk is given the same numerical designation as the input port associated with that trunk.

The input and output stages of the network each comprise 128 8×8 switches. The center portion of the network consists of four independent grids each comprising sixteen 16×16 second stage switches and sixteen 16×16 third stage switches. The switching elements of the present switching network may advantageously be semiconductor switch elements. The various stages of the network are interconnected by means of links; the A links interconnect the first and second stages, the B links interconnect the second and third stages, and the C links interconnect the third and fourth stages. As described earlier herein, before a path can be established through the network the central processor 150 must hunt for idle paths in the network. In order to facilitate this path hunt, the central processor 150 maintains a record of the busy and idle status of the links of the network. By using a symmetrical network and complementary paths the processor needs to find only one idle A link, one idle B link, and one idle C link. Having found these three idle links no further search is needed for the location of a second path since it is certain that the corresponding mirror image links are also idle. As a consequence the processor needs less memory space for storing link busy/idle information and requires less processor real time to perform the path hunt. Having determined the links to be employed the processor must compute the information for controlling the first, second, third, and fourth stage switches which interconnect the selected links. Because of the symmetrical nature of the network, the interconnections made between the second and third stage switches of the network are complementary. Consequently, less processor real time is required to generate control words. Furthermore, a single control word or portion thereof from one time-slot memory can simultaneously control a set of second stage switches and a corresponding set of third stage switches.

The central processor 150 transmits control words to the time-slot memories via a peripheral bus 155 when updating is required. Each control word so transmitted is accompanied by a write address defining the particular time-slot memory to store the control word and the address within the memory where it is to be stored. A peripheral bus interface circuit 156 receives each control word and its associated address from central processor 150 and decodes that portion of the address defining which time-slot memory the control word is to be stored in. In response to this address portion the peripheral interface circuit 156 decoder generates an enable signal which is transmitted from time $t_8$ to $t_0$ to the specific memory to be accessed. Each time-slot memory includes an AND gate 324 (FIGS. 2 and 3) the output of which AND gate is connected to the write enable lead "W" of that memory. The enable signal generated by peripheral interface circuit 156 is applied to one input of the AND gate 324 of the selected time-slot memory, enabling that AND gate to complete a path for a logical "1" write control signal from timing distribution unit 132. The time-slot memories thus are not written into during each time slot but are written only when the peripheral bus interface circuit 156 detects a control word to be written from central processor 150. The write control signals for the time-slot memories are shown in FIGS. 10C, 10D, and 10E as dotted lines implying they are not always gated to the write enable leads "W".

The input time-slot memory circuits 220 (FIG. 2) store control words which are used in part to control the input stage switches 210. Once each time slot, all of the input time-slot memory circuits 22 are read at the address defined by the phase 2 sequence and three bits of each resulting control word define one of the eight possible input stage switch output terminals, i.e., A links, to which the associated input port is to be connected. A fourth bit of the control word is a busy/idle bit which inhibits the establishment of the connecting path if the particular input portion is idle.

The center stage time-slot memory circuits 222 (FIG. 3) store control words for the control of the center stage switch unit 120. There are 512 center stage time-slot memory circuits 222 in the illustrative system and each controls switching paths associated with two center stage input terminals and two center stage output terminals. Once each time slot all of the center stage time-slot memory circuits 222 are read and the resulting control words are stored in buffer registers 223. Each half of the contents of each buffer register 223 defines the path to be established through the center stage switches with respect to one center stage switch input terminal and the corresponding center stage switch unit output terminal. A first half word comprising five bits is used to establish, for example, a path from the 0th input of a given 16×16 input switch to a selected one of the 16 possible outputs, i.e., B links. Due to the mirror image network employed herein this same half word is used to establish a path through a third stage 16×16 switch from one of the 16 available B links to the 0th output terminal thereof. The remaining half of the contents of buffer register 223 is used in the same manner to establish connection paths with respect to a second input terminal of the second stage switch and the corresponding output terminal of the third stage switch. One bit of each word half is a busy/idle bit which inhibits the establishment of the connecting paths if its associated input and output terminals are idle.

The output time-slot memory circuits 221 (FIG. 3) store control words which are used in part to control the output stage switches 211. Once each time slot all of the output time-slot memory circuits 221 are read and three bits of the resulting control word defines the one of the eight possible C links to which its associated output port can be connected. A fourth bit of the control word is a busy/idle bit which inhibits the establishment of the connecting path if the path output port is idle.

It will be remembered that one input time-slot memory circuit 220 is associated with each intermediate buffer memory circuit 205. FIG. 10C represents the addresses and timed control signals applied to the input time-slot memory circuits 220. The read addresses applied to the accessing circuitry for input time-slot memory circuits 220 comprise the phase 2 address sequence generated by the time-slot counter 131. In accordance with address select signals (FIG. 10C, line 2) from timing distribution unit 132, which are used in the manner described with reference to the input buffer memory circuits 402, the read address is applied to a memory access arrangement 225 from time $t_1$ to time $t_9$. The read operation is commenced in response to a logical "1" read control signal (FIG. 10C, line 6) from timing distribution unit 132 from time $t_6$ to time $t_{10}$. Additionally, the 12-bit output generated by each input time-slot memory circuit 220 in response to the applied address is gated to an associated register 226 at time $t_8$. Bits 0-6 of the contents of this register 226 comprise the address used from time $t_{10}$ to $t_2$ to access the intermediate buffer memory circuit 205 associated with the input time-slot memory circuit 220.

At time $t_1$ the contents of bit positions 8-11 of registers 226 are gated to delay buffers 227. The signals stored in the delay buffers 227 are applied directly to decoders 228 one of which is uniquely associated with one input of the input stage switch 210. The one input with which each decoder 228 is associated is the input connected to the intermediate buffer memory circuit 205 which is controlled by the same input time-slot memory circuit 220. Also, at time $t_1$ the data word read from the intermediate buffer memory circuit 205 in response to the address from the register 226 of its associated input time-slot memory circuit 220 is gated to an 11-bit shift register 206. Further, bit position L1 of register 206 is set to a logical "1". After time $t_1$ shift register 206 stores the data word, its associated parity digit and the logical "1" start code. The logical "1" start code is detected at the output of the switching network to determine the presence of a data word. The 11th bit position, i.e., the one through which all bits are serially transmitted to the network, is set to a logical "0" so that a logical "0" is presented to the network at all times that a data word is not being transmitted.

The timing and control signals for the center stage time-slot memory circuits 222 are represented in FIG. 10D. In the manner previously described with reference to the input buffer memory circuits 402 a read address is applied to center stage time-slot memory circuits 222 from $t_{14}$ to $t_7$. The addresses so applied comprise the phase 3 address sequence from the time-slot counter 131. At time $t_4$ the timing distribution unit 132 transmits a logical "1" to the read enable lead "R" of access circuitry 224 for center stage time-slot memory circuits 222. The control word stored at the read address of each center stage time-slot memory circuits 222 is a 12-bit word which is gated to an associated buffer register 223 at time $t_5$. Each control word placed in buffer register 223 controls the establishment of a transmission path with respect to a specific two input terminals and a corresponding two output terminals of the center stage switch unit 120 in the manner previously described. These paths are established at approximately $t_6$.

At times $t_5$ through $t_{15}$ a series of 11 gating pulses is transmitted from timing distribution unit 132 to a shift control input of each shift register 206. Shift register 206 responds to these gating pulses by serially transmitting the start code and the data word to the switching network input associated with the intermediate buffer memory circuit 205. At time $t_1$ the read address from the phase 4 address sequence is applied to the accessing circuitry of the output time-slot memory circuits 221. These memories are read in response to a read control signal occurring from time $t_6$ to $t_{10}$ and the accessed contents of each memory are gated to an associated register 306 at time $t_8$. Four bits of the contents of register 306 are applied to a decoder 307. Decoder 307 in response thereto controls the output switching stages of the switching network. Thus, a path through the output stage of the switching network is established at approximately $t_9$ or one-half operating cycle after a path through the input stage was established.

Each output port of the switching network is uniquely associated with a detector arrangement 701 which in turn is uniquely associated with an output buffer memory circuit 215. A leading one detector 702 located in detector arrangement 701 detects the existence of a data word and stores that data word in a shift register 703. A leading one detector of the type described in U.S. Pat. No. 3,908,084 issued Sept. 23, 1975, can be used as leading one detector 702. The contents of each shift register 703 are gated in parallel at time $t_8$ to an associated buffer register 704. At time $t_5$ a portion of each output stage control word register 306 is gated to an associated delay register 308. The contents of delay registers 308 determine the address location in output buffer memory circuits 215 at which the contents of buffer register 704 are to be stored.

The storage in the output buffer memory circuits 215 takes place at time $t_{11}$ in response to a write control signal (FIG. 10F, line 5) from timing distribution unit 132. A read address from the phase 5 address sequence is applied to the accessing circuitry of output buffer memory circuits 215 from time $t_1$ to $t_9$. At time $t_8$ the contents of the accessed address locations of output buffer memory circuits 215 are gated to an associated data hold register 705. The outputs of each data hold register 705 are transmitted to the digital data receiver and transmitter unit 401 via a recorrelator circuit 706. Recorrelator circuit 706 serves to compress data originating from eight network output ports and thus stored in eight output buffer memory circuits 215 onto seven output multiplex lines in accordance with a distribution algorithm which is complementary to the distribution algorithm of the decorrelator circuit 405. It is understood that it is not essential to the operation of the system that the recorrelator circuit 706 be complementary since any transposition introduced by the decorrelator circuit 405 may be compensated for by translation in the central processor 150. A more detailed description of the recorrelator circuit 706 is given in the previously mentioned Johnson et al., patent. The digital data receiver and transmitter unit 401 converts the data words received from recorrelator circuit 706 to the code format comprising 16 digit portions and serially transmits them to the voice frequency unit 152. Voice frequency unit 152 in turn converts the data words to their analog equivalent signals which are applied thereby to the particular voice trunks associated with their output multiplex line and channel.

As previously described, data words representing signals on a given trunk can be transmitted into the switching network via a single unique network input terminal. Thus, upon determining the identity of a calling trunk and the called trunk between which communication is to occur, the unique input terminal associated with each is determined by translation. When these two input terminals are located the network output terminals to which connection is to be made are known due to the symmetrical nature of the network. For example, if the calling trunk is associated with the 0th input of input stage switch 1 (denoted X in FIG. 5) and the called trunk is associated with input terminal 3 of input switch 9 (denoted Y in FIG. 5), symmetry requires that the output terminals employed be Y' and X' (FIG. 5) respectively.

When the input and output terminals are determined, central processor 150 computes the information required to define the A, B and C links available and the times of their availability. In the course of the following example it is assumed that the A, B, and C links selected for connecting input terminal X to output terminal Y' referred to herein as X→Y' and for connecting input terminal Y to output terminal X' referred to herein as Y→X' are shown in broad dark lines in FIG. 5. Additionally, it is assumed that the available time period selected for communication is the period during which each time-slot memory is accessed at location 126. As is described in greater detail later herein, the time-slot memories associated with the exemplary communication path are read in sequence at the same address locations so that the control words effect a communication path in sequence and overlapped in time.

Central processor 150 by the previously described arrangement, places the information necessary to complete these paths in the appropriate time-slot memories. The information defining the A link is stored in a portion of location 126 of the input time-slot memory associated with input terminal X in the manner previously discussed. The address within the associated intermediate buffer memory circuit 205, which stores the data word to be transmitted to input terminal X, is stored in the second portion of this same address location. The information defining the A link for input terminal Y and the intermediate buffer memory location associated therewith are similarly stored in the input time-slot memory circuit 220 associated with input Y. The information defining the B link for the X→Y' communication path is stored as previously disclosed in the center stage time-slot memory 222 associated with the A link of the X→Y' communication path at location 126. Additionally, the information defining the Y→X' B link is stored in the center stage time-slot memory 222 associated with the Y→X' A link at location 126. The control words defining the X→Y' B link and the Y→X' link also define respectively the Y→X' C link and X→Y' C link due to the symmetrical nature of the network.

The network output terminals to be connected to the selected C links are defined by information stored in location 126 of the output time-slot memory circuit 221 associated with the output terminals X' and Y'. This information defines both the C links to be connected to the X' and Y' output terminals and the address locations in output buffer memory circuits 215 associated with X' and Y' in which the data words are to be stored.

The following is an example of the completion of a path through the switching network from X→Y'. The related path completion from Y→X' and all other path completions are done in a substantially similar manner. Input time-slot memory circuits 220 are read from time $t_1$ to $t_9$ at the current address of the phase 2 address sequence. When the current phase 2 address is 126 the contents of address 126 in the input time-slot memory circuit 220 associated with input terminal X are accessed from time $nt_1$ to $nt_9$ and gated at time $nt_8$ to register 226. Bits 0 through 6 of the contents of register 226 are used from time $nt_{10}$ to $(n+1)t_2$ as the read address for the intermediate buffer memory 205 which stores data words for application to input terminal X. The contents of intermediate buffer memory circuit 205, so accessed, are placed in shift register 206 at time $(n+1)t_1$. Bit positions 8 through 11 of register 226 are also gated at $(n+1)t_1$ to buffer register 227 which applies them directly to decoder 228. Decoder 228 in response thereto connects input terminal X to the A link defined by bit positions 8 through 11. This connection is completed by time $(n+1)t_2$ (FIG. 11, line 2).

The center stage time-slot memory circuits 222 are read in accordance with the phase 3 address sequence from time $t_{14}$ to $t_7$. At the time interval $nt_{14}$ through $(n+1)t_7$ address locations 126 of center stage time-slot memory circuits 222 are read (FIG. 9) and the control words generated thereby are placed in their respective registers 223. Decoders 229 and 230 in response to the contents of registers 223 establish the connections of the B and C links defined thereby by time $(n+1)t_6$ (FIG. 11).

From time $(n+1)t_1$ to $(n+1)t_9$ output time-slot memory circuits 221 are read at location 126, which is the then current address of address sequence 4 (FIG. 9). The contents of location 126 of each output time-slot memory circuit 221 are gated to this associated register 306 at time $(n+1)t_8$. Bits 0 through 3 of register 306 are applied directly to a decoder 307 which connects output terminal Y' to the previously selected C link of the X→Y' communication path. The remainder of the contents of register 306 are gated to a buffer register 308 at time $(n+2)t_5$ for use in addressing output buffer memories 215.

The data word read from the intermediate buffer memory 205 to shift register 206 at time $(n+1)t_1$ is serially transmitted to input terminal X beginning at $(n+1)t_5$ and ending at $(n+1)t_{15}$. This data word passes through the first stage switch prior to time $(n+2)t_1$ when the paths through that switch are changed (FIG. 11, line 2); it traverses the center stage switches prior to $(n+2)t_5$ which is the time that the paths through those switches are modified (FIG. 11, line 4); and it passes through the output stage switch to output terminal Y' before time $(n+2)t_8$, which is the time that the connection paths in the output stage switches are changed (FIG. 11, line 5). The data word passing through output terminal Y' is received by the leading one detector 702 associated with output terminal Y' and applied to shift register 703. At time $(n+2)t_8$ the contents of shift register 703 are gated to buffer register 704 and they are read from that register and written into output buffer memory circuit 215 at the location defined by delay register 308 from time $(n+2)t_9$ to $(n+3)t_1$. It will be remembered that the contents of delay register 308 from $(n+2)t_5$ to $(n+3)t_5$ are a portion of the contents of location 126 of output time-slot memory circuit 221 and define the address in output buffer memory circuit 705, which is to store the transmitted data word. This address location is the one uniquely associated with the called trunk.

What is claimed is:
1. In combination:
   timing means for generating a plurality of equally spaced timing signals defining time slots of fixed duration;

a time division multiplex line carrying a plurality of channels of digital data words wherein the time duration of each channel is substantially equal to one of said time slots of fixed duration and wherein each digital data word is in a first format and occupies substantially an entire time multiplexed channel;

a switching network having input and output terminals and comprising a plurality of switching elements;

means for establishing communication paths through said switching network at a rate such that any given switching element may be used in any given communication path for a period of time less than or equal to one of said time slots of fixed duration;

reformatting means for converting said digital data words from said first format to a second format; and means, responsive to said timing signals, for serially transmitting the data words in said second format to an input terminal of said switching network in a period of time less than one of said time slots of fixed duration.

2. Combination in accordance with claim 1 wherein said reformatting means operates in synchronism with the data words carried by said time-division multiplex line and comprises means for producing a second code format in which a start code is associated with each data word to facilitate asynchronous detection of data words in said second code format; and further comprising:

a data word receiver connected to the output terminals of said switching network for asynchronously receiving data words in said second format.

3. The combination in accordance with claim 2 further comprising:

means for converting said data words received by said data word receiver in said second format to said first format; and means for transmitting the data words in said first format, produced by said means for converting, on an output time-division multiplex line.

4. In combination:

timing means for generating a plurality of equally spaced timing signals defining time slots of fixed duration;

an input time-division multiplex line carrying a plurality of channels of digital data words wherein the time duration of each channel is substantially equal to one of said time slots of fixed duration and wherein each digital data word is in a first format and occupies substantially an entire time multiplexed channel;

a switching network having input and output terminals and comprising a plurality of switching elements;

means for establishing communication paths through said switching network at a rate such that any given switching element may be used in any given communication path for a period of time less than or equal to one of said time slots of fixed duration;

first formatting means for converting said digital data words from said first format to a second format wherein each data word includes a start code;

means, responsive to said timing signals, for serially transmitting the data words in said second format to an input terminal of said switching network in a period of time less than one of said time slots of fixed duration;

receive means, connected to the output terminals of said switching network, responsive to said start code for receiving the data words in said second format;

second formatting means for converting the data words in said second word format received by said receive means to said first format; and retransmission means for transmitting said data words in said first format from said second formatting means on output time-division multiplex lines wherein the time duration of each channel of said output time-division multiplex lines is substantially equal to one of said time slots of fixed duration and wherein each digital data word occupies substantially an entire time multiplex channel.

5. The combination in accordance with claim 4 wherein:

said first formatting means includes control means for controlling said first formatting means to operate in synchronism with the data words on said input time multiplex line; and said receive means responds to said start code by receiving data words in said second format in an asynchronous manner.

6. In combination:

timing means for generating a series of equally spaced timing signals defining time slots of fixed duration;

a source of digital words;

a storage means for storing said digital words;

means for serially transmitting said digital words from said source to said storage means at a first bit rate;

a switching network comprising input and output terminals for selectively completing time-division communication paths between said input and said output terminals wherein said communication paths exhibit transmission delays of significant duration with respect to one of said word time slots and which time delays vary in accordance with the communication path selected;

means for controlling said switching network to establish communication paths such that the holding time for any point along said communication path is less than or equal to one of said time slots;

reformatting means for reading digital words from said storage means and for concatenating a start code to the beginning thereof;

means responsive to said timing signals for serially transmitting each of said digital words and its associated start code obtained from said reformatting means to the inputs of said switching network at a second bit rate and within a period of time less than or equal to one of said time slots, said second bit rate being faster than said first bit rate; and receive means connected to the output terminals of said switching network responsive to said start code for receiving said digital words.

7. In combination:

a first digital transmitter for transmitting serial data words in time separated channels in a first code format wherein each data word in said first code format occupies substantially an entire one of said channels;

a first digital data receiver, operating in synchronism with said first digital data transmitter, for receiving data words in said first code format and for converting said data words to a second code format wherein each data word includes a start code;

a switching network having a plurality of input and output terminals;

a second digital data transmitter connected to said first digital data receiver for serially transmitting date words in said second format to an input terminal of said switching network in a period of time less than one of said time separated channels; and a second digital data receiver connected to an output terminal of said switching network responsive to said start code for receiving data words in said second code format asynchronously with respect to said second digital data transmitter.

8. The combination in accordance with claim 7 further including:

reformatting means connecting to said second digital data receiver for converting the data words received by said second digital data receiver in said second code format to said first code format and for transmitting said data words in said first code format; and means for receiving said data words from said reformatting means in synchronism with said reformatting means.

9. In combination:

a first digital transmitter for transmitting serial data words in time separated channels in a first code format wherein each data word digit in said first code format comprises two digit portions and each data word occupies substantially an entire one of said time separated channels;

a first digital data receiver, operating in synchronism with said first digital data transmitter, for receiving data words in said first code format and for converting said data words to a second code format wherein each data word digit comprises one digit portion and each data word includes a start code;

a high-capacity switching network having a plurality of input and output terminals with a plurality of serially connected networdk stages therebetween;

control means for establishing communication paths between said input and output terminals of said switching network by establishing paths through said serially connected network stages in sequence and overlapped in time;

a second digital data transmitter connected to said first digital data receiver for serially transmitting data words in said second format to an input terminal of said switching network in a period of time approximately ⅝ of the time duration of one of said time separated channels; and a second digital data receiver connected to an output terminal of said switching network responsive to said start code for receiving data words in said second code format asynchronously with respect to said second digital data transmitter.

* * * * *